INVENTOR.
BORIS M. OSOJNAK

Feb. 3, 1970  B. M. OSOJNAK  3,492,979
INTERNAL COMBUSTION ENGINE
Filed Feb. 6, 1968  7 Sheets-Sheet 4

INVENTOR.
BORIS M. OSOJNAK
BY
*Lon H. Komanski*
ATTORNEY

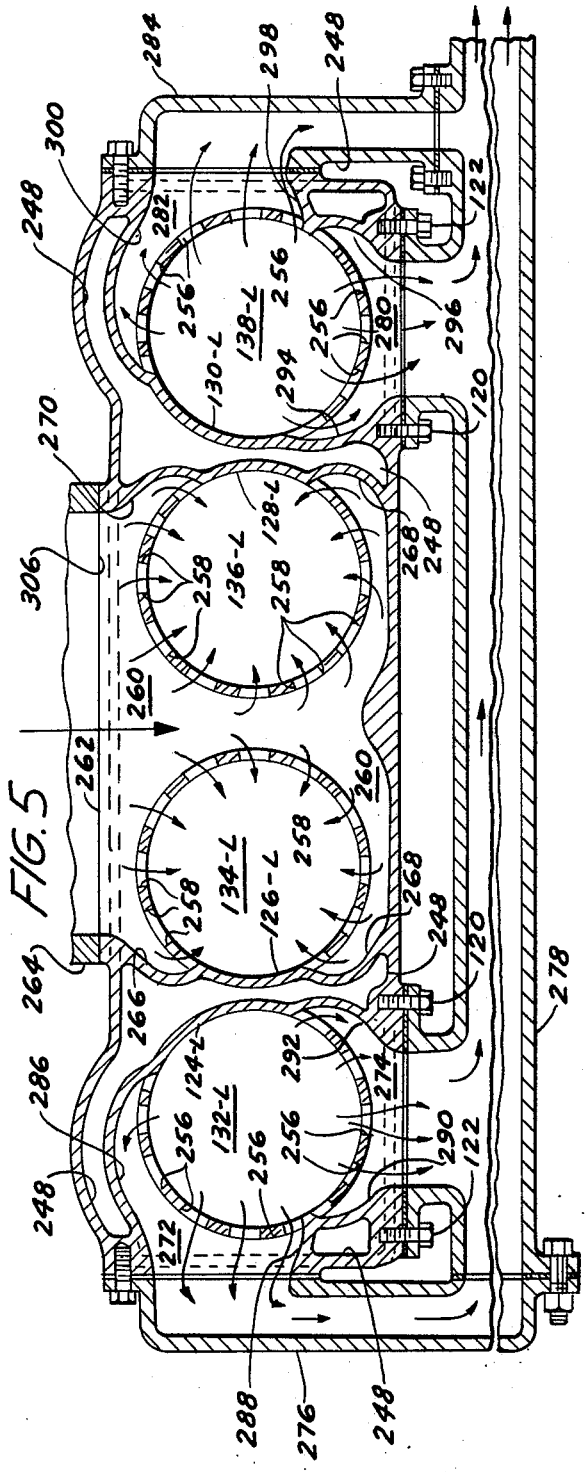
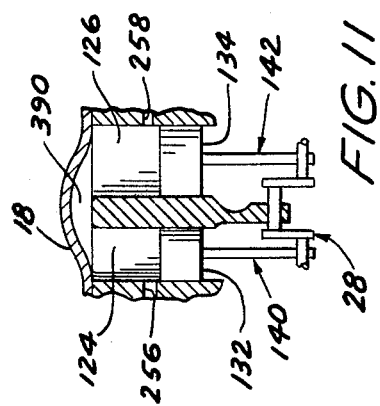
FIG. 5
FIG. 11
BORIS M. OSOJNAK
INVENTOR.
BY
ATTORNEY

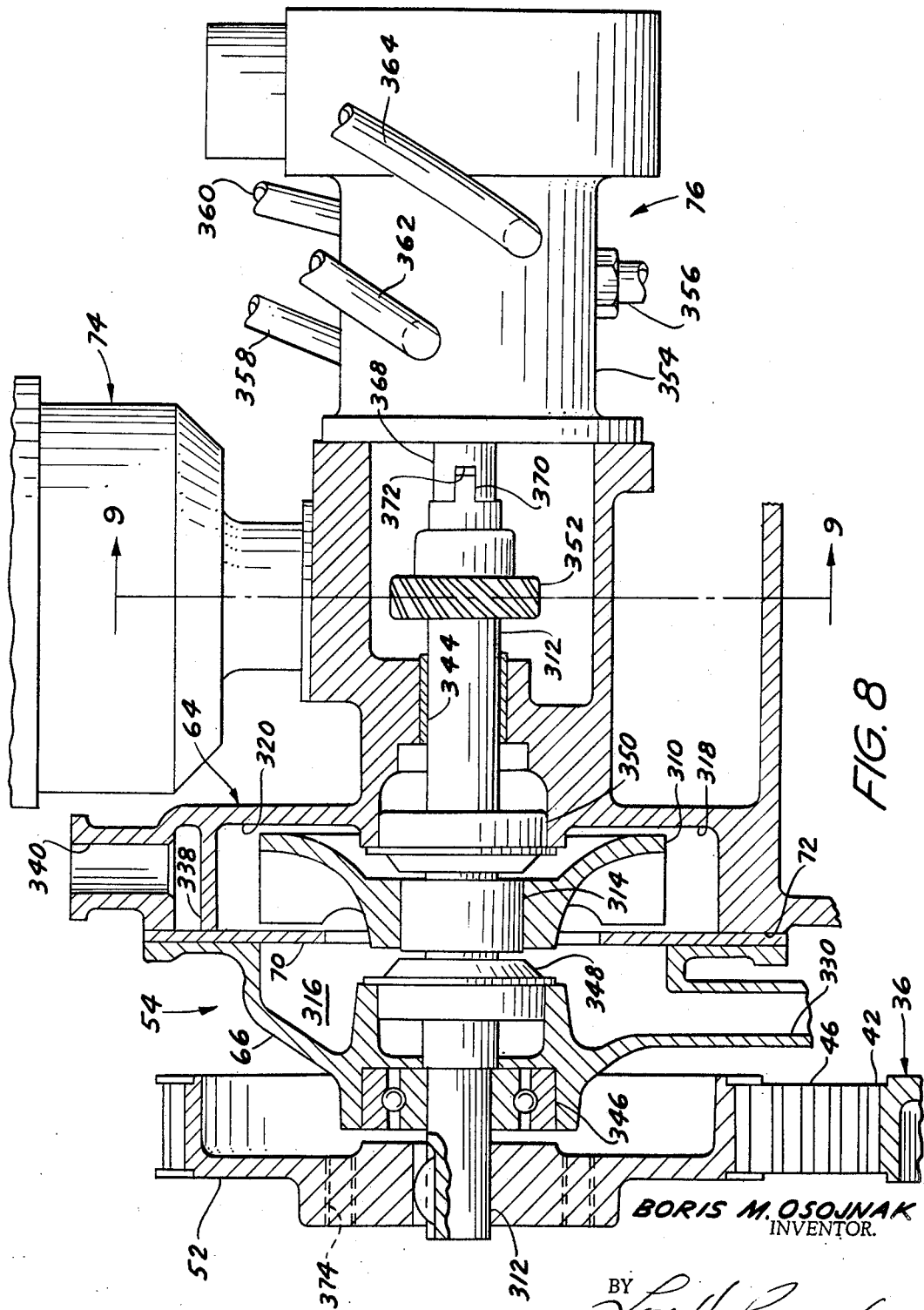

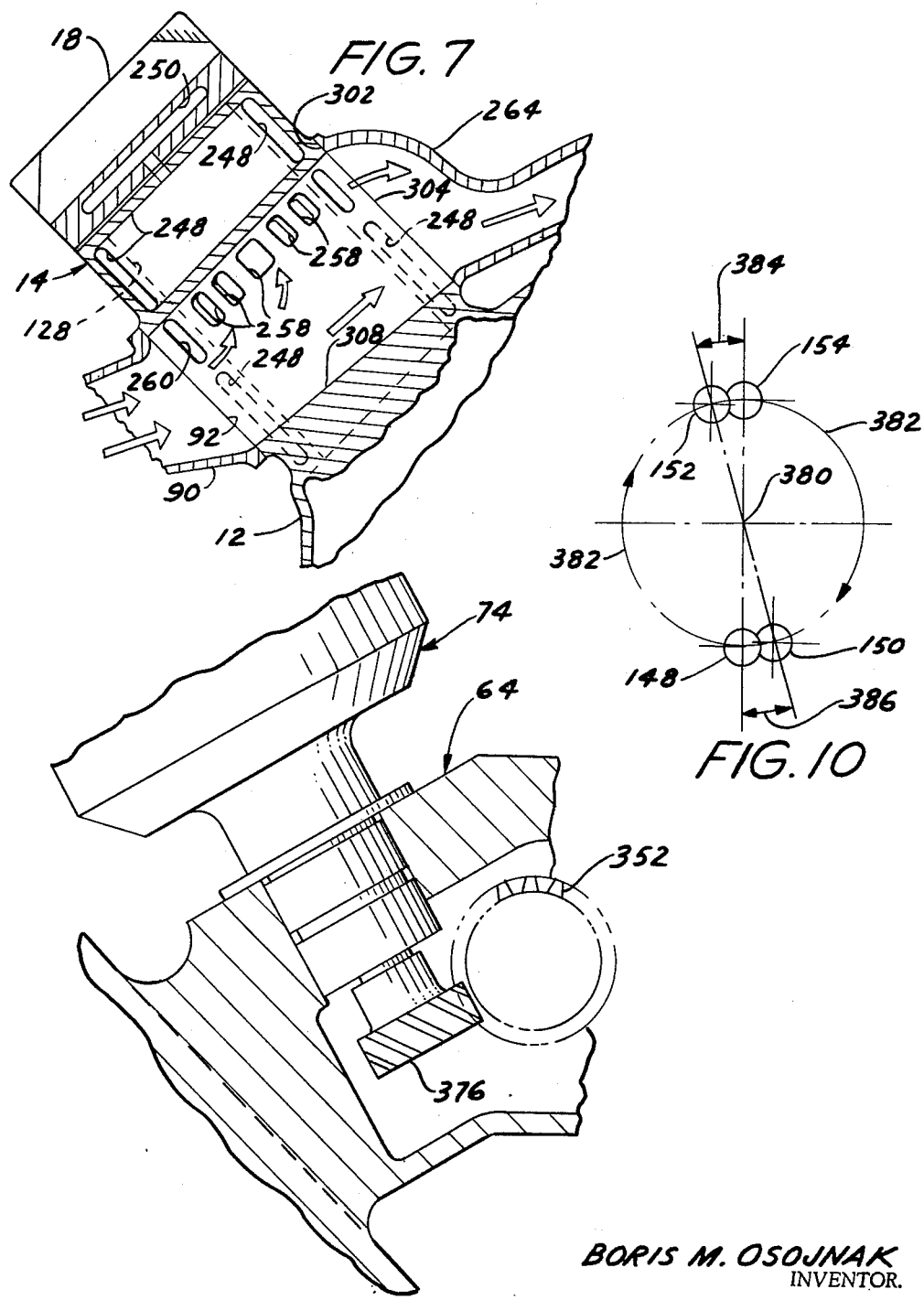

United States Patent Office 3,492,979
Patented Feb. 3, 1970

3,492,979
INTERNAL COMBUSTION ENGINE
Boris M. Osojnak, 512 Roanoke Drive,
Birmingham, Mich. 48010
Filed Feb. 6, 1968, Ser. No. 703,380
Int. Cl. F02b 25/02, 27/00
U.S. Cl. 123—53    5 Claims

ABSTRACT OF THE DISCLOSURE

An engine having a plurality of pistons has a first piston situated within a first cylinder which has porting means exposed only to incoming air, and a second piston within another cylinder which has porting means exposed only to an exhausting system. Each of the pistons serves to both open and close the porting means in the respective cylinders in timed relationship to engine operation. Chamber-like passage means are provided interconnecting the first and other cylinders in order to enable the flow of air from the first cylinder to the other. Further, fuel supply and ignition means are situated so as to be at least within the general environs of the interconnecting passage means so as to effect combustion therein.

BACKGROUND OF THE INVENTION

Internal combusion piston type engines of the prior art, whether of the in-line of V-type, have required separate valves for both air intake and exhaust. Additionally, in order to operate the valves such things as cam shafts, valve lifters, valve rocker arms and push rods are often found to be necessary. Such items are costly to manufacture and add considerably to the overall weight of the engine.

Some two cycle engines have attempted to overcome the requirement of such things as intake and exhaust valves, with all the related structure, by having both air intake and gas exhaust ports formed within each cylinder and then having the piston within the cylinder open and close both of the ports. This of course requires the spacing of such ports axially of the cylinder and consequently limits the maximum time that either of the ports is open due to the stroke of the piston. Further, because of the increased linear velocity of the piston during higher engine speeds, the time span for opening either of the ports is correspondingly reduced. It is apparent, especially in the two cycle type of engine, that a considerable amount of the exhaust will be retained within the piston even after the exhaust port has been opened by the piston and, of course, the percentage of unburned hydrocarbons on the succeeding piston stroke increases.

Exhaust emission into the atmosphere of unburned hydrocarbons has become a serious problem to health. It is, of course, apparent that the quantity of such unburned hydrocarbons is basically dependent upon the weight-rate of fuel consumed by the engine. It therefore follows that if the vehicle which is being propelled by the engine can be reduced in its total weight, a lesser weight-rate of fuel will be required in order to deliver the same effective output horsepower at the driving wheels. Consequently, a substantial reduction in the weight of the engine itself, without reducing horsepower, would exhibit the desired effect of reducing the quantity of unburned hydrocarbons.

SUMMARY OF THE INVENTION

The present invention contemplates an internal combustion engine comprising an engine block rotatably supporting a crankshaft having first and second bearing surfaces formed thereon with first and second pistons respectively operatively connected to the bearing surfaces and slideably received with first and second cylinders formed in the block; the first cylinder has porting means formed therein which affords communication only between the interior of the first cylinder and an air supply passage whereas the second cylinder has porting means formed therein which affords communication only between the interior of the second cylinder and an exhaust system; the first and second cylinders are connected to each other by an interconnecting passage means which has, at least in close proximity thereto, fuel injection nozzle means and ignition igniter means for both creating a fuel-air mixture as well as causing ignition thereof.

Accordingly, an object of this invention is to provide a piston engine having a plurality of cylinders and a corresponding number of pistons respectively contained therein in a manner so that uniflow scavenging of the cylinders occurs after each ignition of the combustible mixture contained therein.

Other objects and advantages of this invention will become apparent when reference is made to the following description considered in conjunction with the drawings.

DESCRIPTION OF THE DRAWINGS

In the accompanying drawings:

FIGURE 5 is a generally longitudinal cross-sectional view taken generally on the plane of line 5—5 of FIGURE 1 and looking in the direction of the arrows;

FIGURE 7 is a fragmentary cross-sectional view taken generally on the plane of line 7—7 of FIGURE 3 and looking in the direction of the arrows;

FIGURE 8 is an enlarged fragmentary cross-sectional view taken generally on the plane of the line 8—8 of FIGURE 1 and looking in the direction of the arrows;

FIGURE 9 is a fragmentary cross-sectional view taken generally on the plane of line 9—9 of FIGURE 8 and looking in the direction of the arrows;

FIGURE 10 is a schematic representation of the relationship of the connecting rod bearings on the engine crankshaft; and FIGURE 11 is a simplified diagrammatic representation of a modified form of the invention.

DESCRIPTION OF PREFERRED EMBODIMENT

Figure 1:
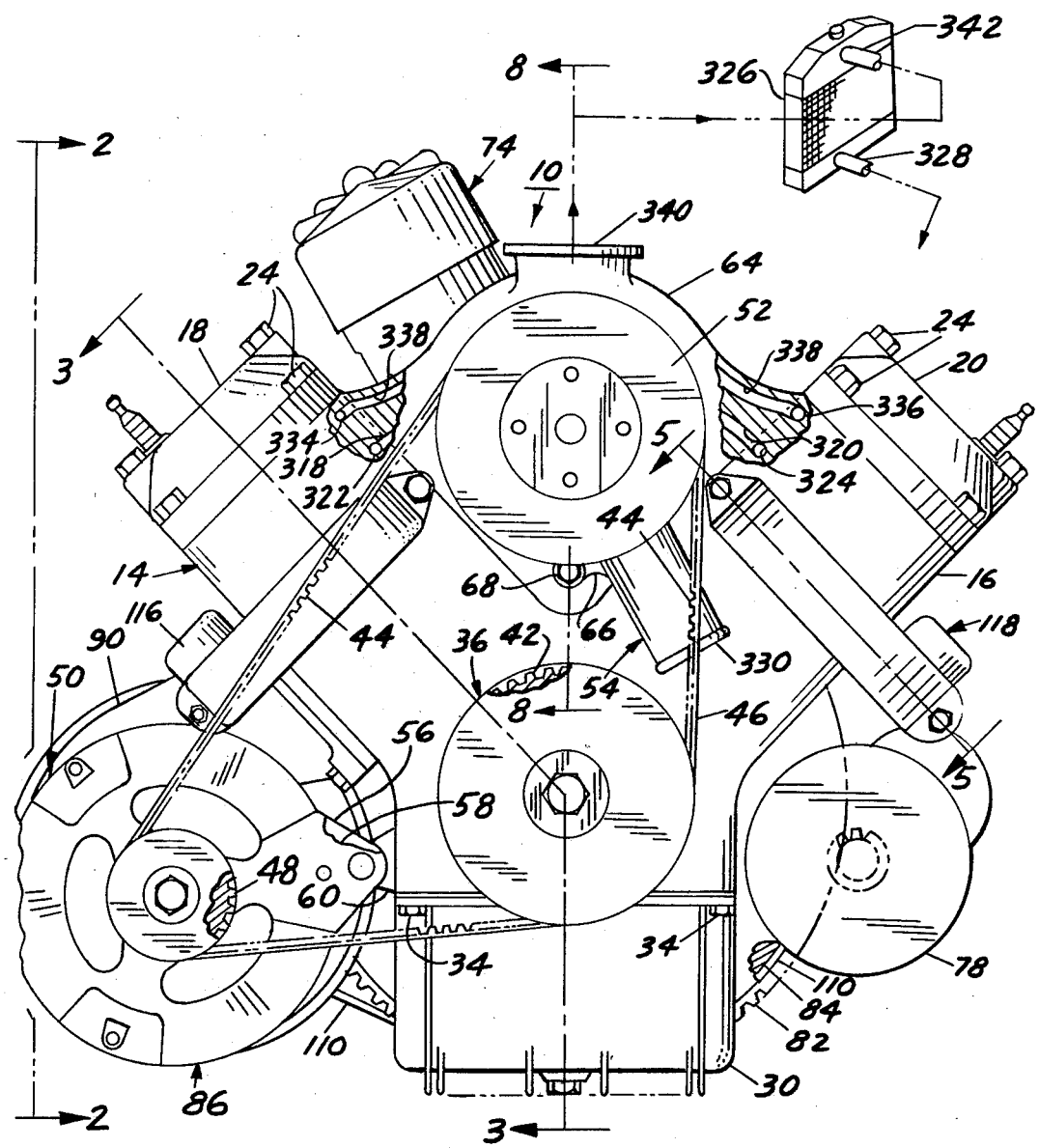
FIGURE 1 is a front elevational view of an engine constructed in accordance with the teachings of this invention.

Referring now in greater detail to the drawings, FIGURE 1 illustrates the engine 10 as being comprised of a V-type engine block 12 having inclined cylinder banks 14 and 16 atop which are mounted cylinder heads 18 and 20, respectively, each being provided with an intermediate cylinder head gasket 22 and secured to the banks 14 and 16 as by suitable bolts 24. As can be seen, each of the banks 14 and 16 is integrally formed with a lower base portion 26 which, generally, contains and supports the engine crankshaft 28. Secured to the base 26, at the underside thereof, is an oil pan 30 which, as is well known in the art, serves to contain the engine lubricant. The oil pan 30 and a suitable gasket 32 may be collectively secured to the engine block 12 as by bolts or screws 34.

Figure 3:
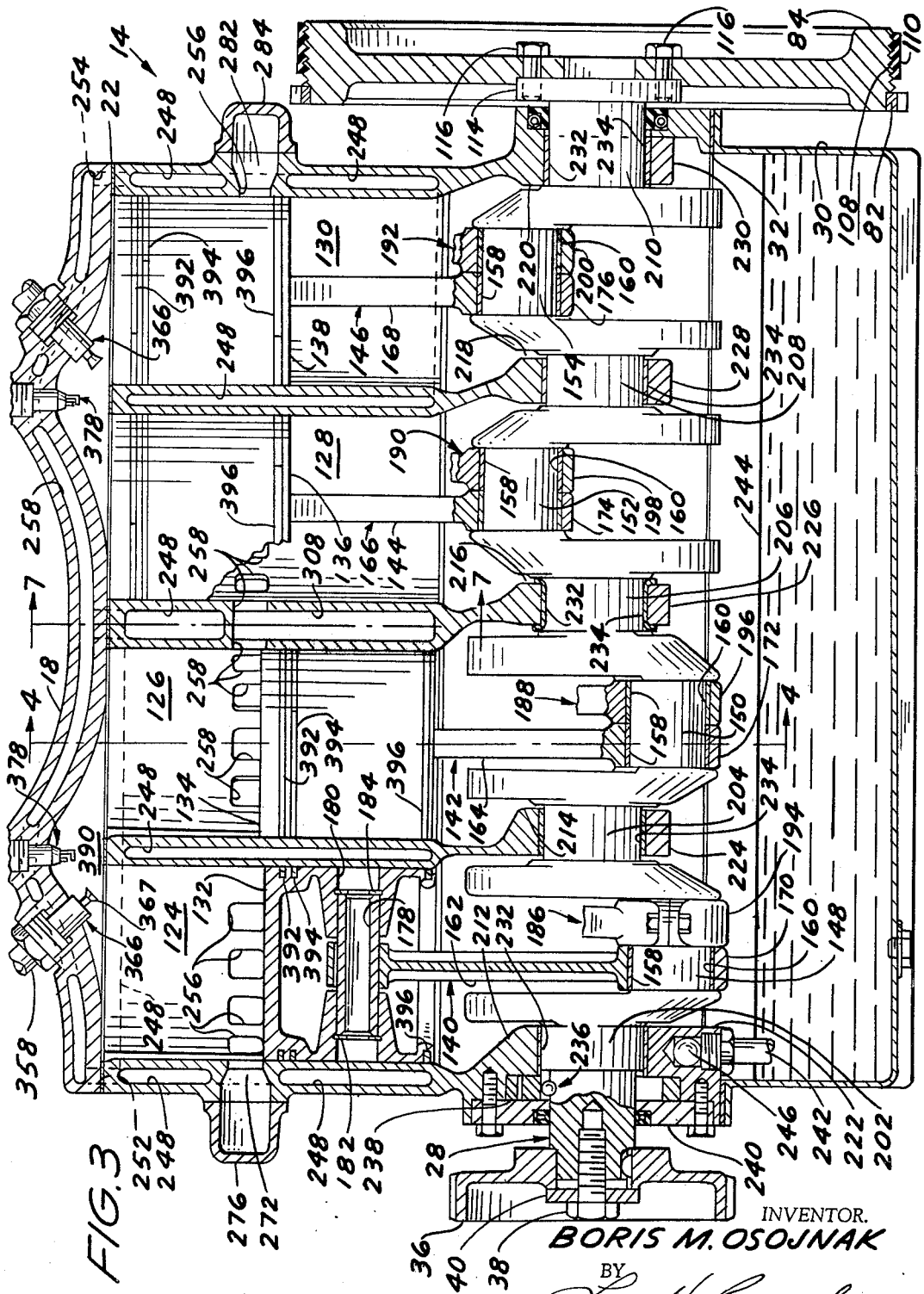
FIGURE 3 is a longitudinal cross-sectional view taken generally on the plane of line 3—3 of FIGURE 1 and looking in the direction of the arrows.

As can best be seen in FIGURES 1 and 3, a sprocket 36 is mounted on the crankshaft 28 and secured thereto as by a screw 38 and washer 40. Teeth 42 of sprocket 36 engage mating teeth 44 of a flexible continuous timing belt 46 which is also in operative engagement with a drive sprocket 48 of an electrical generator or alternator 50 as well as in engagement with a suitable sprocket 52 of a water pump assembly 54.

Alternator 50 may be secured to the engine block 12 as by a pair of projecting mounting arms 56 and 58 which are respectively secured to a mounting boss or projecting ear 60, formed on block 12, as by bolts or screws 62.

Figure 2:
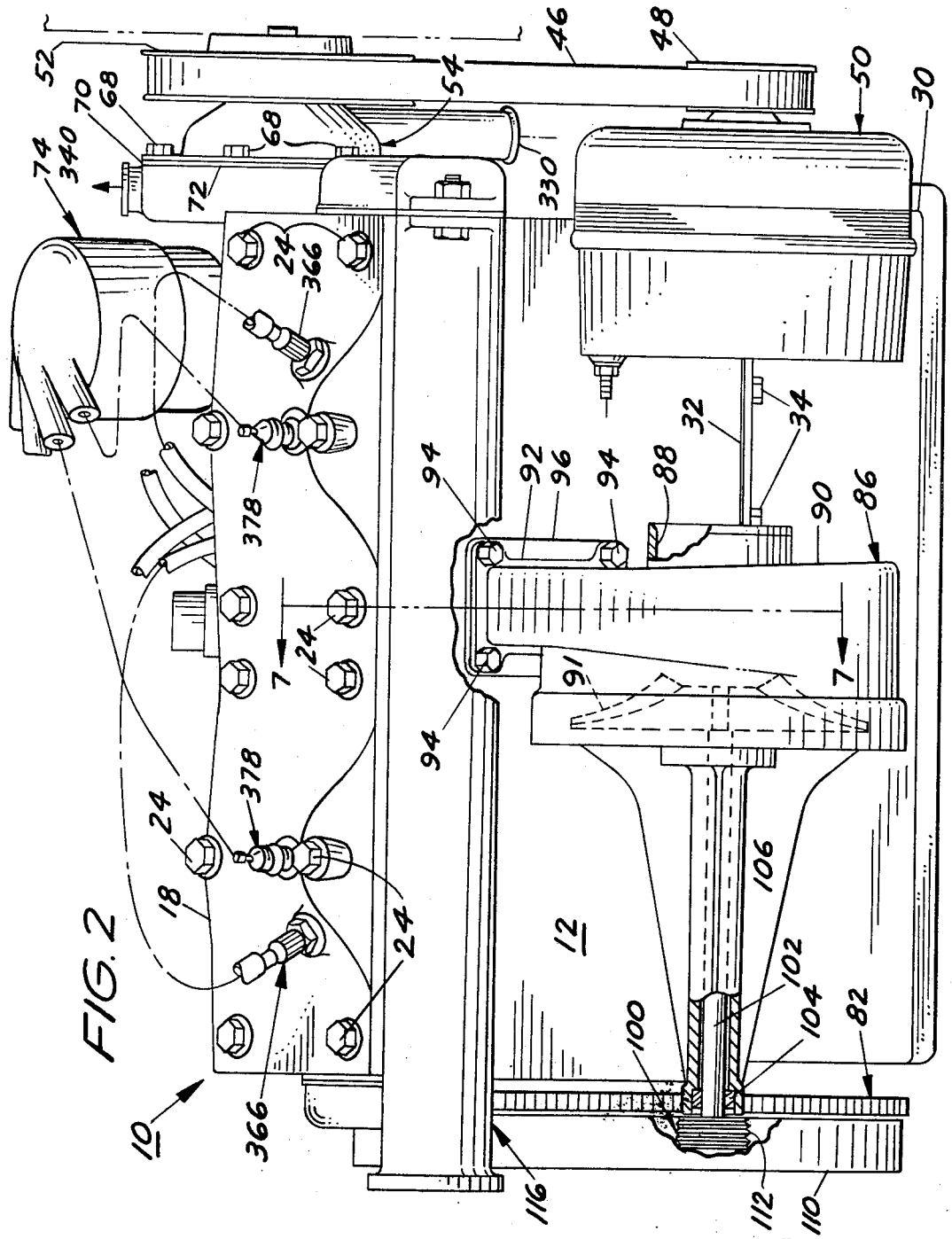
FIGURE 2 is a side elevational view taken generally on the plane of line 2—2 of FIGURE 1 and looking in the direction of the arrows.

As seen in both FIGURES 1 and 2, the engine block 12 is preferably provided with an integrally formed housing portion 64 located generally between the banks 14 and 16, at the forward portion of the engine, which is adapted to receive certain components of the water pump assembly 54 and, further, support the water pump cover 66 as by a plurality of screws 68. An inlet and outlet divider plate 70 is contained between the cover 66 and the forward face 72 of the housing portion 64. Suitable additional seals (not shown) may, of course, be provided between adjoining surfaces of the water pump assembly 54. As will become evident from a consideration of other figures, to be discussed, the housing portion 64 also provides support for a timing shaft along with an ignition distributor assembly 74 and a fuel injection system 76 each of which is driven by the said timing shaft.

An electrically operated starter motor 78, which may be of any suitable design as, for example, any of those well known in the art, is suitably secured to the engine block 12 so as to have the starter motor pinion gear 80 in meshed engagement with the teeth of a ring gear 82 mounted on the engine flywheel 84.

An air compressor or blower assembly 86, having an air intake as at 88 in its outer housing 90, is mounted at its air outlet end 92 by a plurality of bolts or screws 94 to a mounting surface or boss 96 formed on the engine block 12 and generally surrounding the air inlet passage of the engine 10.

As best illustrated in FIGURE 2, the blower assembly 86 is shown as having a multi-V-groove sheave 100 suitably secured to a shaft 102 rotatably mounted as by bearings, such as at 104, within an extending portion 106 of the blower housing 90. The other end of the shaft 102 is secuured to compressor rotor 91, contained generally within the housing 90, which is in relatively close proximity to the air inlet 88. The specific construction of the compressor assembly 86 is, of course, not of prime importance; any of the compressors well known in the art, especially as employed in combination with internal combustion engines for supplying air thereto, can be used.

As can be seen in both FIGURES 1 and 2, the engine 10 is provided with a ring gear 82 suitably secured to the flywheel 84 which is peripherally provided with a plurality of V-grooves 108 formed circumferentially thereabout. Such grooves 108 are best seen in FIGURE 3. A multi-V-groove continuous drive belt 110 is engaged with both the V-grooves 108 of the flywheel 84 as well as the V-grooves 112 of the sheave 100 thereby driving the compressor roter 91 anytime that the engine crankshaft 28 is rotated. As illustrated in FIGURE 3, the flywheel 84 may be secured to a flange 114 formed on the crankshaft 28 as by a plurality of bolts or screws 116.

As can be seen in FIGURE 1, banks 14 and 16 are provided with separate exhaust manifold assemblies 116 and 118 which are secured to the outboard sides of the banks as by screws 120 and 122.

FIGURE 3, a cross-sectional view taken generally on the plane of line 3—3 of FIGURE 1, illustrates the right bank 14 of the engine 10 as being comprised of four cylinders 124, 126, 128 and 130 which respectively contain pistons 132, 134, 136 and 138.

Connecting rod assemblies 140, 142, 144 and 146 respectively connect pistons 132, 134, 136 and 138 to the crankshaft throw bearings 148, 150, 152 and 154. Upper and lower sleeve bearings 158 and 160 may be provided between the respective connecting rod arms 162, 164, 166 and 168, the cooperating connecting rod caps 170, 172, 174 and 176 and the crankshaft bearings 148, 150, 152 and 156.

Each of the connecting rod assemblies may be connected to the respective cooperating pistons, as typically illustrated by piston 132 and connecting rod 162, by means of a wrist pin 178 axially retained within the wrist pin bore 180 by snap rings 182 and 184.

A second set of four pistons 132–L, 134–L, 136–L and 138–L, contained in the cylinders 124–L, 126–L, 128–L and 130–L of the left bank 16, are respectively connected, in the manner typically illustrated by wrist pin 178, to connecting rod assemblies 186, 188, 190 and 192 which, in turn are journalled to crankshaft bearings 148, 150, 152 and 154 by means of connecting rod bearing caps 194, 196, 198 and 200 with interposed upper and lower split sleeve bearings 158 and 160.

Crankshaft 28 is also provided with five main bearings 202, 204, 206, 208 and 210 which are respectively journalled in engine main bearing supports 212, 214, 216, 218 and 220 which, in turn, have cooperating lower main bearing caps 222, 224, 226, 228 and 230. Upper and lower split-type bearing sleeves 232 and 234 may be provided at each of the main bearings.

A rotor type oil pump assembly 236, which may be of any construction well known in the art, is operatively connected to the crankshaft 28 for actuation thereby. Generally, the pump 236 may be comprised of an outer ring 238 having internally formed tooth-like configurations, directed radially inwardly, and a cooperating rotor member with externally formed tooth-like projections, directed radially outwardly. The mating action of the tooth-like portions causes a pumping action to occur. The pump assembly may be contained as by a cover 240 provided with suitable seals.

A conduit 242 of suitable length has one end in communication with the reservoir of oil 244, within the crankcase pan 30, and its other end in communication with an inlet conduit 246 of oil pump assembly 236. Accordingly, rotation of crankshaft 28 causes oil to be drawn from reservoir 244 through supply conduit 242, pump inlet conduit 246, through the pump rotor and discharged, for example, into an oil galley (not shown but well known in the art). With the proper drilling of oil passages through, for example, the engine main bearing supports 212, 214, 216, 218 and 220 along with both radial and angular drilling oil, under pressure, can be distributed from the oil galley to each of the connecting rod bearings as well as the main bearings.

Figure 4:
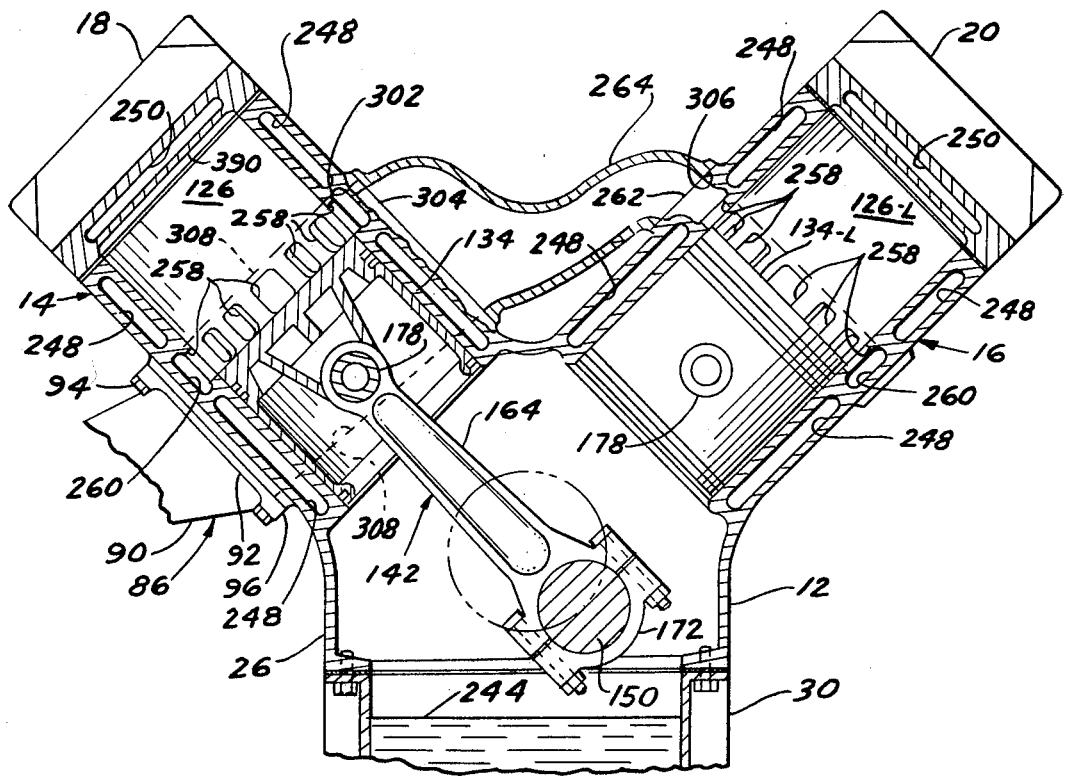
FIGURE 4 is a cross-sectional view taken generally on the plane of line 4—4 on FIGURE 3 and looking in the direction of the arrows.

As illustrated generally in FIGURES 3, 4 and 5, the walls of engine banks 14 and 16 may be suitably cored in order to form coolant passages 248 therein in order to conduct a circulating flow of coolant, such as water, generally about the cylinders of each of the engine banks. Similarly each of the engine cylinder block heads 18 and 20 are provided with cored coolant passages 250 which may communicate with passages 248 as by suitable interconnecting passages 252 and 254 formed as at the ends thereof.

End cylinders 124 and 130 of the right bank 14 have a plurality of exhaust ports 256 formed through the walls thereof while the intermediate cylinders 126 and 128 of the right bank have a plurality of air intake ports 258 formed through the walls thereof. Similarly, as seen in, for example, FIGURE 5, and cylinders 124–L and 130–L of the left bank 16 have a plurality of exhaust ports 256 formed through the walls thereof while the intermediate cylinders 126–L and 128–L have a plurality of air intake ports 258 formed through the walls thereof.

As also seen in FIGURE 5, the intake ports 258 of both intermediate cylinders 126–L and 128–L communicate between the interior of said cylinders and an internal cored chamber 260 generally surrounding the intake ports. The air intake chamber 260 has an inlet end 262 in communication with a plenum type air supply conduit 264 also illustrated in FIGURE 4. As shown in FIGURE 5, interior walls 266, 268 and 270 serve not only to define the air inlet chamber 260 but also define portions of the coolant passages 248.

The arrangement of the exhaust ports 256 in end cylinders 124–L and 130–L of FIGURE 5 is typical of that as exists in end cylinders 124 and 130 of the right bank 14. That is, as shown in FIGURE 5, exhaust ports 256 communicate with internally formed exhaust chambers 272 and 274 which, in turn respectively communicate with exhaust manifold conduits 276 and 278 secured to each other and the engine block 12. Similarly, exhaust ports 256 of cylinder 130–L communicate with internally formed exhaust chambers 280 and 282 which respectively communicate with exhaust manifold conduits 278 and 284. Exhaust manifold conduit 284 is, of course, secured to engine block 12 and manifold conduit 278. Walls 286 and 288 of exhaust chamber 272, walls 290 and 292 of exhaust chamber 274, walls 294 and 296 of exhaust chamber 280 and walls 298 and 300 of exhaust chamber 282 also serve to define portions of the coolant passages 248. It should be noted that during engine operation, the air intake ports 258 always and only function as intake ports and that the exhaust ports 256 always and only function as exhausting ports.

FIGURE 4, a cross-sectional view taken generally on the plane of line 4—4 of either FIGURES 1, 2 or 3, illustrates piston 134 at the bottom of its stroke with the air inlet ports 258 within cylinder 126 fully uncovered while piston 134–L has been illustrated in a position wherein it is partially covering the inlet ports 258 within cylinder 126–L.

Figure 6:
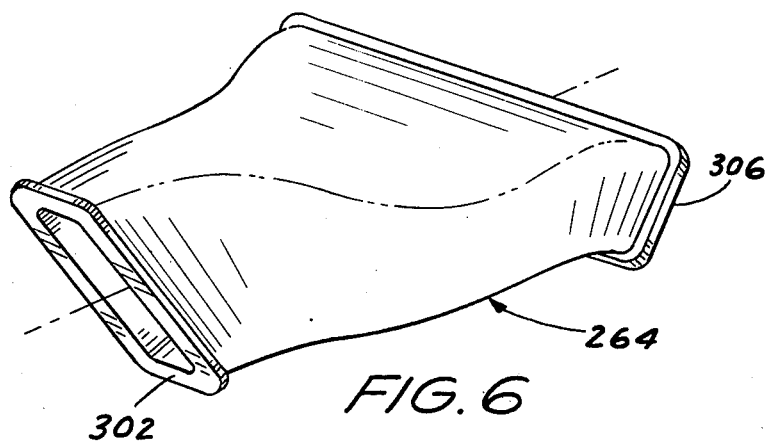
FIGURE 6 is an enlarged perspective view of one of the elements shown in FIGURE 4.

Air supply conduit 264 (also illustrated in enlarged perspective in FIGURE 6) has its inlet end 302 operatively connected to an outlet 304, formed on the right bank 14, and its outlet end 306 operatively connected to the inlet 262 of the left bank 16. The air supplied by the blower assembly 86 is directed to chamber 308, formed generally between pistons 134 and 136, from where the air is supplied both to air supply chamber 260 of bank 14 and through conduit 264 to the inlet of the air supply chamber 260 of bank 16. As shown in both FIGURES 4 and 6, the cross-over air supply conduit 264 is formed with a downward depression 310 at its upper surface so as to provide additional clearance for some of the cooperating engine accessories such as the fuel injection system 76.

FIGURE 7, a fragmentary cross-sectional view taken on the plane of line 7—7 of either FIGURES 2 or 3, and looking in the direction of the arrows, illustrates in greater detail the air passage 308 formed in the right bank 14 generally between cylinders 126 and 128 so as to communicate with the air inlet ports 258 of both cylinders 126 and 128. Again, it should be noted that the outlet 304 of chamber or passage 308 communicates with the inlet end 302 of air passage 264 which, as illustrated in FIGURES 4 and 5, supplies air to chamber 260 of bank 16 and ultimately to intake ports 258 of cylinders 126–L and 128–L.

FIGURE 8, a fragmentary cross-sectional view taken generally on the plane of line 8—8 of FIGURE 1, illustrates the water pump assembly 54 as being comprised of a rear housing 64, preferably formed integrally the engine block 12, which receives therein an impeller 310 which is suitably secured for rotation with a shaft 312 as by means of a mounting hub 314. A divider plate 70 is contained between the forward face 72 of pump housing 64 and the pump cover 66 which may be secured by screws 68 as shown in FIGURES 1 and 2. The plate 70 serves to generally divide the internal chamber formed by the housing 64 and cover 66, into two general chambers, one being the pump inlet chamber 316 and the other being the discharge chamber or chambers.

Impeller 310 actually discharges the coolant into two separate discharge chambers or passages 318 and 320 which respectively lead to the inlet coolant ports 322 and 324 of the right and left banks 14 and 16, respectively. The incoming coolant is, of course, supplied from conduit 328 of radiator or heat exchanger 326 to pump inlet conduit 330 and into chamber 316 from where it flows through the aperture 332 of divider plate 70 into the impeller 310. The impeller of course causes the coolant to flow into coolant ports 322 and 324 which lead to the coolant passages 248 in both cylinder banks. The coolant circulates through passages 248 and finally is forced out of outlet ports 334 and 336 of banks 14 and 16, respectively, and into a generally transverse conduit 338 communicating with an upper return conduit portion 340 which, in turn, leads to conduit 342 of radiator 326.

Shaft 312 may be journaled in the housing portion 64 as by a sleeve bearing 344 and within the cover 66 as by a bearing assembly 346. Further, shaft 312 is provided with suitable sealing assemblies 348 and 350 respectively received within cover 66 and housing 64. A drive gear 352 suitably secured to shaft 312 for rotation therewith engages (as best seen in FIGURE 9) a driven gear of the ignition distributor assembly 74.

A fuel injection assembly 76, having an outer housing 354 suitably secured to the housing portion 64, is provided with a fuel supply conduit 356 (which communicates with a suitable source of fuel not shown) and a plurality of fuel discharge conduits 358, 360, 362 and 364 respectively communicating with the two fuel injection nozzles 366 of each bank of cylinders.

The invention as herein disclosed does not depend on the employment of any one particular fuel injection apparatus and any fuel injection of the type wherein the fuel is cyclically delivered to the combustion cylinders, as contrasted to those injection systems which, without interruption, continuously spray fuel into the combustion cylinders, may be employed in practicing the invention.

The injection system somewhat pictorially illustrated herein is intended to represent a fuel injection system of the type illustrated by either Browne Patent 2,137,384, Downing Patent 2,731,175, DeClaire Patent 2,965,090 or DeClaire Patent 2,965,092. In addition, it is also contemplated that a fuel injection system such as that illustrated in a booklet entitled "Why Fuel Injection" and copyrighted 1963 by Marvel-Schebler Division of Borg-Warner Corporation, could be employed in the invention herein disclosed.

In the fuel injection system 76 of FIGURE 8, the housing 354 is secured against rotation; however, a projecting shaft 368 is internally connected to rotor means which function to meter and selectively distribute fuel to the fuel conduits 358, 360, 362 and 364. Accordingly, in order to have the distribution of such metered fuel in timed relationship to the stroke of pistons 132, 138, 132–L and 138–L shaft 368 is drivingly engaged to timing shaft 312 as by means of a cooperating tongue 370 and groove 372. Consequently, rotation of shaft 368 and crankshaft 28 is in timed relationship because of gear 52 (which is keyed to shaft 312), gear 36 (which is keyed to crankshaft 28) and the timing belt 46 engaging both gears 52 and 36. It should also be pointed out that, preferably, a cooling fan is secured to the forward face of gear 52 as by means of, for example, suitable screws engaging tapped holes 374.

FIGURE 9, a fragmentary cross-sectional view taken generally on the plane of line 9—9 of FIGURE 8, illustrates the mounting of the ignition distributor 74 within the housing 64 as well as the engagement of the drive gear 352, which is secured for rotation with shaft 312, with driven gear 376 of the ignition distributor 74.

The ignition distributor 74 may be of any conventional design well known in the art wherein the ignition advance mechanism is one which is actuated in response to the speed of rotation of the engine crankshaft. Further, the overall ignition system may be of conventional design employing, for example, make and break contacts (often referred to as distributor points) as well as an ignition coil which is intermittently charged and then discharged through a selected spark plug such as that illustrated at 378.

FIGURE 10 schematically illustrates the angular relationship of the crankshaft connecting rod bearings 148, 150, 152 and 154 as well as the direction of rotation of crankshaft 28 when viewed from the front or timing-gear-end of the engine 10. Assuming the direction of rotation of crankshaft 28 about a center axis 380 to be clockwise, as indicated by arrows 382, the connecting rod bearing 148, to which pistons 132 and 132–L are operatively connected, is angularly positioned so as to be slightly ahead of connecting rod bearing 150 to which pistons 134 and 134–L are operatively connected.

Similarly, connecting rod bearing 152, to which pistons 136 and 136–L are operatively connected, and connecting rod bearing 154, to which pistons 138 and 138–L are operatively connected, are respectively disposed 180° away from connecting rod bearings 150 and 154. The angular displacement as between connecting rod bearings 148 and 150 as well as between connecting rod bearings 152 and 154 may be in the order of fifteen degrees (15°) as illustrated generally 384 and 386. The axis of rotation 380 of crankshaft 28 is, of course, the centerline of crankshaft main bearings 202, 204, 206, 208 and 210.

OPERATION OF THE INVENTION

Referring generally to FIGURES 1, 2, 3 and 4, the general operation of the invention can be as follows:

(1) As the crankshaft rotates (as described with reference to FIGURE 10) piston 132 moves upward ahead of piston 134; this enables exhaust ports 256 within cylinder 124 to be closed by piston 132 while permitting the blower 86 to force air into cylinder 126 through the intake ports 258;

(2) Further rotation of crankshaft 28 causes power piston 132 to move upwardly nearer to its top dead center position while, at the same time, causing the air pumping or compression piston 134 to close air intake ports 258 within cylinder 126;

(3) As the power piston 132 more nearly approaches its top dead center position its linear velocity decreases enabling the air compression piston 134 to more nearly approach the position of the power piston 132;

(4) Because cylinders 124 and 126 are in communication with each other by means of the dome-like chamber 390 formed generally by the inner surface of header 18, the continued upward movement of compression piston 134 causes the air within both cylinders 124 and 126, as well as the interconnecting chamber 390, to be under equal pressure;

(5) At the precise moment of crankshaft rotation, because of the timing arrangement illustrated in FIGURES 8 and 9, metered fuel is injected through nozzle 366 and sprayed generally within interconnecting chamber 390 and cylinder 124 as well as, to some degree, into cylinder 126; however, because of the position of injector nozzle 366—proportionately very little fuel would be injected into the confines of cylinder 126;

(6) Also because of the timing arrangement illustrated by FIGURES 8 and 9, the ignition distributor 74 causes a sparking event to occur at the spark plug 378 thereby igniting the fuel-air mixture within cylinder 124 and chamber 390;

(7) As ignition occurs (at some point of rotation prior to the top dead center position of power piston 132) the resulting gases undergo expansion thereby forcing power piston 132 downward with air compression piston, because of the angular displacement of connecting rod bearings 148 and 150, following in like manner;

(8) When power piston 132 has moved downwardly a sufficient distance exhaust ports 256 within cylinder 124 are opened thereby permitting the exhaust gases to flow therethrough and into conduits 276 and 278 of the exhaust manifold assembly 116; during this time the intake ports 258 within cylinder 126 are also opened to at least to some partial degree thereby permitting the blower 86 to force air through intake ports 258 so as to cause a sweeping-like action through cylinder 126, inter-connecting chamber 390 and cylinder 124; and (9) Following the above, the cycle is repeated with respect to pistons 132 and 134.

The cycle of operation as described with respect to pistons 132 and 134 occurs with regard to pistons 136 and 138 within cylinders 128 and 130. In the cooperating pair of pistons 136 and 138, piston 138 is the power piston having exhaust ports 256 while piston 136 is the compression piston having air intake ports 258. Likewise, power piston 132–L, connected to connecting rod 186, and compression piston 134–L, connected to connecting rod 188 cooperate with each other to function as a pair in the manner of pistons 132 and 134. Similarly, power piston 138–L, connected to connecting rod 192, and compression piston 136–L, connected to connecting rod 190, cooperate with each other to function as a pair in the manner of pistons 136 and 138.

Even though the drawings clearly illustrate the fact, it should be noted that although the upper piston rings 392 and 394 of each of the pistons traverse the intake ports 258 or exhaust ports 256, as the case may be, the lower piston ring 396 of each cylinder is not required to so traverse the intake or exhaust ports thereby minimizing the wear experienced by ring 396.

As can be seen from the foregoing, the invention as herein disclosed functions somewhat as a conventional two cycle piston engine in that ignition occurs every time that a power piston approaches its top dead center position. However, unlike conventional two cycle piston engines, the engine of this invention employs a pair of pistons contained within respective cylinders which are in communication with each other by means of an inter-connecting passageway or combustion chamber. In the engine of this invention, one of the pair of cylinders is provided with air intake ports which are opened and closed by the piston contained therein, while the other of the pair of cylinders is provided with exhaust ports which are opened and closed by the piston contained therein. This is, of course, in contrast to the conventional two cycle engines wherein each cylinder is provided with both air intake and exhaust ports and the piston contained within such cylinder is required to open and close both the intake and exhaust ports.

Another important advantage of the invention is that the engine of this invention provides such an abundance of air for combustion as to greatly minimize any exhaust emission of unburned hydrocarbons. This becomes evident when one considers, as illustrated by FIGURE 3, that both cylinders, of the cooperating pair, are supplied with air for combustion by the time that, for example, power piston 132 moves upwardly a distance sufficient to close exhaust ports 256. After this point further upward movement of, for example, cooperating pistons 132 and 134 causes compression of the total volume of air in both cylinders 124 and 126.

As was previously mentioned, the invention herein disclosed contemplates the use of a fuel injection system which is intermittent in that fuel is not continuously sprayed through each of the nozzles 366 but rather cyclically delivered thereto, in metered quantities, in timed relationship to crankshaft rotation. Accordingly, it follows that nozzles 366 are of the type, well known in the art, which terminate communication therethrough during periods other than when fuel is being supplied to the combustion chamber. Such nozzles may be comprised of a spring-loaded pintle 367 which shuts off communication through the nozzle until such time as fuel, under a predetermined minimum pressure is applied thereto, at which time the pintle opens to permit spraying of metered fuel into the combustion chamber. The precise construction of the nozzle 366 is not important and it suffices, as hereinbefore defined, merely to identify the general type of nozzle best suited for use in practicing the invention.

When ignition and combustion occur, for example, in cylinders 124 and 126 (FIGURE 3) both pistons 132 and 134 will, of course, experience a downward force from the expanding gases. However, the relative degree to which such force is transmitted by pistons 132 and 134 is a function of phase angles 384. Further, depending on the angle or position of nozzle 366 relative to cylinders 124, 126 and interconnecting chamber 390, the spray of fuel into such areas will be varied. Accordingly, by selective positioning of nozzle 366, fuel stratification can be achieved so as to cause proportionately more or less of the fuel to be burned generally within chamber 390 and cylinder 124 containing piston 132. Consequently, with a superabundance of air and proper fuel stratification very nearly complete burning of all fuel injected into the cylinders is achieved and very little, if any, unburned hydrocarbons are emitted into the exhaust. This effect can be further enhanced by varying the relative effective areas of the cooperating pairs of pistons identified as power pistons and compression pistons. That is, referring again to pistons 132 and 134 in FIGURE 3, for example, the invention also contemplates the modification of forming piston 132 to have an effective top area substantially less than the top area of piston 134. It is further contemplated that the ratio of such areas could be in the order of 1:2 wherein the effective area of air intake piston 134 would be twice the effective area of piston 132. This is diagrammatically illustrated in FIGURE 11.

Accordingly, in an arrangement as contemplated by the above modifications, there is a superabundance of air at part throttle low road load engine operation as well as all other engine operating conditions except for wide-open throttle operation. Consequently, the hydrocarbons normally emitted by prior art internal combustion piston engines during such part throttle operation are almost totally eliminated because of the injection of a metered amount of fuel into an overabundance of air. Further, as previously discussed, the stratification of fuel also enhances the burning characteristics of the fuel-air mixture.

Another important feature of the invention is its ability to produce output horsepower at a much more favorable weight-to-horsepower ratio. That is, as an approximation, an engine constructed in accordance with the teachings of this invention could produce the same horsepower, in for example the 200 H.P. range, as a V-8 type piston engine of the prior art but at an engine weight approximately half of that of the said prior art V-8 engine.

Although only basically one embodiment of the invention has been disclosed and described, it is apparent that other embodiments and modifications of the invention are possible within the scope of the appended claims.

I claim:

1. An internal combustion engine, comprising an engine block, a crankshaft rotatably carried by said block, a pair of cylinders formed in said block, a pair of pistons respectively slideably received within said cylinders, first and second bearing surfaces formed on said crankshaft eccentrically disposed with respect to the center of rotation of said crankshaft and angularly displaced with respect to each other, first connecting means operatively connecting one of said pair of pistons to said first bearing surface, second connecting means operatively connecting the other of said pair of pistons to said second bearing surface, an air intake passage formed in said block, first porting means formed in one of said cylinders enabling communication only between the interior of said one cylinder and said air intake passage, an exhaust passage formed in said block adapted for connection to suitable exhaust conveying conduitry, secondy porting means formed in the other of said cylinders enabling communication only between the interior of said other cylinder and said exhaust passage, said one piston being effective for at times terminating communication through said first porting means, said other piston being effective for at times terminating communication through said second porting means, said one piston being formed to have an effective top area substantially larger than the effective top area of said other piston, passage means interconnecting said pair of cylinders enabling the flow of air from said first porting means through said one cylinder and into said other cylinder, means for supplying fuel to at least said interconnecting passage means for mixture with the air contained therein, and means for causing ignition of the said mixture of said fuel and air.

2. An iinternal combustion engine comprising an engine block having first and second cylinder banks inclined with respect to each other so as to form a generally V-like configuration; a crankshaft rotatably carried by said block; first, second, third and fourth cylinders formed in said first bank; first, second, third and fourth pistons respectively slideably received in said first, second, third and fourth cylinders; first and second bearing surfaces formed on said crankshaft eccentrically disposed with respect to the center of rotation of said crankshaft and angularly displaced with respect to each other; third and fourth bearing surfaces formed on said crankshaft eccentrically disposed with respect to the center of rotation of said crankshaft and angularly displaced both with respect to each other and with respect to said first and second bearing surfaces; first, second, third and fourth connecting means respectively connecting said first, second, third and fourth pistons to said first, second, third and fourth bearing surfaces; said first, second, third and fourth cylinders being arranged sequentially axially of said crankshaft so that said second cylinder is between said first and third cylinders and said third cylinder is between said second cylinder and said fourth cylinder; an air intake passage formed in said first bank; first porting means formed in said second cylinder enabling direct communication between the interior of said second cylinder and said intake passage in said first bank; second porting means formed in said third cylinder enabling direct communication between the interior of said third cylinder and said air intake passage in said first bank; first and second exhaust passage means formed in said first bank and adapted for connection to suitable exhaust conveying circuitry; third porting means formed in said first cylinder enabling direct communication only between the interior of said first cylinder and said first exhaust passage means; fourth porting means formed in said fourth cylinder enabling direct communication only between the interior of said fourth cylinder and said second exhaust passage means; said first piston and said second piston being respectively effective for at times sequentially terminating said communication through said third and first porting means, said first and second angularly displaced bearing surfaces being effective to cause said first piston to terminate said communication through said third porting means before said second piston completely terminates said communication through said first porting means; said third and said fourth pistons being respectively effective for at times sequentially terminating said communication through said second and fourth porting means, said third and fourth angularly displaced bearing surfaces being effective to cause said fourth piston to terminate said communication through said fourth porting means before said third piston completely terminates said communication through said second porting means; fifth, sixth, seventh and eighth cylinders formed in said second bank; fifth, sixth, seventh and eighth pistons respectively slideably received within said fifth, sixth, seventh and eighth cylinders; fifth, sixth, seventh and eighth connecting means operatively respectively connecting said fifth, sixth, seventh and eighth pistons to said first, second, third and fourth bearing surfaces; a second air inlet passage formed in said second bank generally intermediate of said sixth and seventh cylinders; fifth porting means formed in said sixth cylinder enabling communication only between said second air inlet passage and the interior of said sixth cylinder; sixth porting means formed in said seventh cylinder enabling communication only between the interior of said seventh cylinder and said second air inlet passage; third and fourth exhaust passage means formed in said second bank each adapted for connection to suitable exhaust conveying conduitry; seventh porting means formed in said fifth cylinder enabling direct communication only between said third exhaust passage means and the interior of said fifth cylinder; eighth porting means formed in said eighth cylinder enabling direct communication only between said fourth exhaust passage means and the interior of said eighth cylinder; said fifth and sixth pistons being respectively effective to at times sequentially terminate said communication through said seventh porting means, said first and second angularly displaced bearing surfaces being effective to cause said fifth piston to terminate said communication through said seventh porting means before said sixth piston completely terminates said communication through said fifth porting means; said seventh and eighth pistons being respectively effective to at times sequentially terminate said communication through said sixth and eighth porting means, said third and fourth bearing surfaces being effective to cause said eighth piston to terminate said communication through said eighth porting means before said seventh piston completely terminates said communication through said sixth porting means; air passage means interconnecting and communicating with said air intake passage in said first bank and said second air inlet passage formed in said second bank; an air inlet orifice formed in said air intake passage for communication with a source of air for supplying air to both said air intake passage in said first bank and said second air inlet passage in said second bank; first interconnecting passage means interconnecting said first and second cylinders so as to enable the flow of air from said first porting means through said second cylinder and into said first cylinder; second interconnecting passage means interconnecting said third and fourth cylinders so as to enable the flow of air from said second porting means, through said third cylinder and into said fourth cylinder; third interconnecting passage means interconnecting said fifth and sixth cylinders enabling the flow of air from said fifth porting means, through said sixth cylinder and into said fifth cylinder; and fourth interconnecting passage means interconnecting said seventh and eighth cylinders enabling the flow of air from said sixth porting means, through said seventh cylinder and into said eighth cylinder.

3. An internal combustion engine according to claim 2 wherein said second, third, sixth and seventh pistons respectively have an effective top area substantially greater than the effective top area of said first, fourth, fifth and eighth pistons.

4. An internal combustion engine according to claim 3 wherein the ratio of the said effective top areas of said second, third, sixth and seventh pistons to the said effective top areas of said first, fourth, fifth and eighth pistons, respectively, is in the order of 2:1.

5. An internal combustion engine according to claim 1 wherein the ratio of said effective top area of said one piston to the said effective top area of said other piston is in the order of 2:1.

References Cited

UNITED STATES PATENTS

| | | |
|---|---|---|
| 1,795,099 | 3/1931 | Stuart. |
| 2,234,918 | 3/1941 | Linthwaite. |
| 2,421,884 | 6/1947 | Holmes. |
| 2,844,131 | 7/1958 | Beveridge. |
| 2,976,861 | 3/1961 | Udale. |
| 2,989,022 | 6/1961 | Lundquist. |

FOREIGN PATENTS

| | | |
|---|---|---|
| 235,896 | 9/1926 | Great Britain. |
| 596,958 | 1/1948 | Great Britain. |
| 840,945 | 1/1939 | France. |

WENDELL E. BURNS, Primary Examiner

U.S. Cl. X.R.

123—55